United States Patent [19]

Inamasu et al.

[11] Patent Number: 5,496,656

[45] Date of Patent: Mar. 5, 1996

[54] BATTERY

[75] Inventors: Tokuo Inamasu; Kazunari Takeda; Syuichi Izuchi; Youetsu Yoshihisa, all of Takatsuki, Japan

[73] Assignee: Yuasa Corporation, Osaka, Japan

[21] Appl. No.: 193,018

[22] PCT Filed: Jun. 28, 1993

[86] PCT No.: PCT/JP93/00880

§ 371 Date: Feb. 7, 1994

§ 102(e) Date: Feb. 7, 1994

[87] PCT Pub. No.: WO94/00889

PCT Pub. Date: Jan. 6, 1994

[30] Foreign Application Priority Data

Jun. 30, 1992 [JP] Japan ................. 4-197661
Sep. 18, 1992 [JP] Japan ................. 4-275157
Mar. 15, 1993 [JP] Japan ................. 5-081255

[51] Int. Cl.$^6$ ................................. H01M 10/52
[52] U.S. Cl. ........................ 429/57; 429/192; 429/212
[58] Field of Search ................. 429/57, 59, 192, 429/212

[56] References Cited

U.S. PATENT DOCUMENTS

| | | | |
|---|---|---|---|
| 4,810,599 | 3/1989 | Kondo et al. | 429/212 X |
| 4,847,174 | 7/1989 | Palmer et al. | 429/192 X |
| 4,925,746 | 5/1990 | Pavlov et al. | 429/57 |
| 5,330,856 | 7/1994 | Gonzales | 429/212 |

FOREIGN PATENT DOCUMENTS

| | | |
|---|---|---|
| 48-69784 | 9/1973 | Japan . |
| 53-34295 | 9/1978 | Japan . |
| 56-32740 | 7/1981 | Japan . |
| 60-127669 | 7/1985 | Japan . |
| 63-301469 | 12/1988 | Japan . |
| 1-109665 | 4/1989 | Japan . |
| 1-107470 | 4/1989 | Japan . |

*Primary Examiner*—Stephen Kalafut
*Attorney, Agent, or Firm*—Evenson, McKeown, Edwards & Lenahan

[57] ABSTRACT

A battery equipped with a cathode composite (2), an anode composite or an anode (4), an electrolyte layer (3) and a sealing material (6); characterized by that a material such as an element belonging to VIII-group of periodic table such as palladium etc., for example, is included in an inside of the battery. Gas produced in the battery inside is absorbed to the above material or added to a residual reactive double bond in an ion-conductive high-molecular compound by the above material, so that a rise of battery inside pressure due to gas is restrained and expansion and bursting of the battery are thus prevented.

18 Claims, 6 Drawing Sheets

5,496,656

BATTERY

This application is a national phase application of PCT application no. PCT/JP93/00880, published as WO 94/00889.

TECHNICAL FIELD

This invention relates to a battery operating reversibly under an environmental temperature, electrodes and an electrolyte of which are improved.

BACKGROUND ART

With a recent tendency to design various electric equipment into micro-electronic forms, demand for a battery, which is small in size, light in weight and thin, and provided with a high energy density. In the field of primary batteries, a small-sized and light-weight battery such as a lithium battery has already been put to practical use. However, its application field has been limited to a small area. In the field of secondary batteries, a battery utilizing a non-aqueous electrolyte, which can be made smaller in size and weight, attracts public attention at present as an alternate battery in place of the conventional lead-battery and a nickel-cadmium battery.

In order to obtain a small-sized and light-weight battery having a high energy density and a high reliability, it is necessary to examine the following problems (1) and (2).

(1) Problem of electrode active material and electrode (2) Problem of electrolyte Electrode active materials utilizing intercalation and doping phenomena of the layer compound are especially studied now in many research organizations. These materials are expected to have extremely excellent charge/discharge cycle characteristics, because a theoretically complicated chemical reaction does not take place at the time of the electrochemical reaction in charging and discharging. However, in such electrode active materials, expansion and contraction of the electrode active material occurs when charging and discharging. To cope with this problem, it is required to improve the mechanical strength of the electrode and electrolyte.

A liquid electrolyte, especially prepared by dissolving an ionic compound in an organic electrolyte, has so far been generally used for the electrolyte. However, since there have been problems such as leakage of the electrolyte to the outside of the battery and elusion and evaporation of the electrode material etc. when a liquid electrolyte has been used, problems of inferior long-term reliability and spattering of the electrolyte in the sealing process have remained unsolved. As a means to solve these problems, that is, a means to improve solution-leakage resistance and long-term reliability, an ion-conductive high-molecular compound having a high ionic conductivity has been reported and further studied.

When the ion-conductive high-molecular compound is used as an electrolyte for an electrochemical device, it becomes necessary to make the electrolyte into a film shape in order to reduce internal resistance. This is especially important for a film type battery. In the case of the ion-conductive high-molecular compound, it is possible to work its uniform film easily into a desired shape, and various methods for this purpose are known. Heating and polymerizing has so far been used frequently because of its convenience. However, the heating and polymerizing method has included the following problems.

(1) It is hard to increase manufacturing speed because the heating and polymerizing time becomes very long.

(2) It is hard to carry out uniform polymerization because a temperature gradient is apt to be produced in a heating furnace.

(3) The heating furnace and its auxiliary facility become large because the heating must be done in an inert atmosphere.

(4) A cross-linked network structure becomes more irregular because displacement of the polymerization initiator occurs in a liquid composition of the ion-conductive high-molecular compound.

Incidentally, serious problems were brought about when using the ion-conductive high-molecular compound for the battery. As the charge/discharge cycles were repeated; water was extracted from the cathode composite, this water reached the anode through the electrolyte layer comprising the ion-conductive high-molecular compound, the water reacted with the lithium metal of the anode to produce hydrogen gas, and the pressure inside the battery was increased by this hydrogen gas. As a result, expansion and bursting of the battery took place to impair a long-term reliability and safety.

This invention is made in consideration of the above present circumstances, and an object of it is to provide a battery which does not have the problem of expansion and bursting, thereby improving the long-term reliability and safety, has improved charge/discharge cycle characteristics, and further can make workability better.

DISCLOSURE OF THE INVENTION

The battery of this invention comprises an inside chamber formed by current collector plates and a sealing material. Inside the chamber is a cathode composite including an active material and another material, an anode composite including an active material and another material or an anode comprising the active material only, and an electrolyte. An ion-conductive high-molecular weight compound including one or more kinds of ionic compound in solution is used in at least one of the cathode composite, the anode composite and the electrolyte. One or more kinds of materials capable of absorbing gas produced in the inside of the battery or causing the gas to add to residual reactive double bonds in the ion-conductive high-molecular weight compound, are included in the inside of the battery.

In this invention, the gas produced in the inside of the battery is absorbed by the material or added by the material to the residual reactive double bond in the ion-conductive high-molecular weight compound, so that an increase in the inside pressure of the battery due to gas is restrained and expansion and bursting of the battery are thus prevented. The ion-conductive high-molecular weight compound is formed by polymerization of a specified high-molecular weight compound. However, it is confirmed that a residual amount of reactive double bonds remains, to about 5% max. even when the compound is polymerized by irradiation of ionizing radiation or ultraviolet rays.

In the case when the electrolyte layer comprises the ion-conductive high-molecular weight compound, formation of dendrite when using lithium for the anode is restrained and liquid-leakage resistance i.e. long-term reliability can be improved. Further, since mechanical strength of the electrolyte layer is improved, short-circuiting at the time of manufacture of battery and during the charge/discharge cycle can be prevented.

The above-mentioned materials may exist anywhere in the inside of the battery. For example, (1) Within or on the surface of the cathode composite, (2) Within or on the surface of the anode composite, (3) On the surface of the anode, (4) On the surface of the sealing material, and (5) Within the electrolyte layer etc. may be mentioned.

For the foregoing materials; elements belonging to group VIII of the periodic table such as palladium, ruthenium, rhodium or platinum etc. may be used. Further, palladium-treated carbon, palladium-treated $MnO_2$, platinum black, platinum-treated carbon, misch metal alloy or $LaNi_5$ may be used. As the misch metal alloy, $MmNi_{3.7}Fe_{0.3}Al_{0.3}Co_{0.7}$ may be mentioned. These materials offer good absorbing property to hydrogen gas. Elements belonging to group III or group V are specially excellent for the metal which absorbs hydrogen gas. Further, active carbon zeolite, hollow glass fine sphere, ethyl ether, acetone, gelatin, starch or dextrin may be used too, although they are inferior in absorbing property. A binder may be included in at least one of the cathode composite and the anode composite. By including these materials, the mechanical strength of the electrode can be improved. The expansion and contraction of an electrode accompanied by repeated charging/discharging can be eliminated so that the charge/discharge cycle characteristic can be improved from this aspect too.

The binder is prepared by dissolving or dispersing an organic compound, which will be described below, in a solvent such as dimethylformamide or xylene etc., for example. As the organic compound, a polymer or copolymer of the following compounds may be mentioned. As the compounds; acrylonitrile, methacrylonitrile, vinylidene fluoride, vinyl fluoride, chloroprene, vinylpyridine and their derivatives, vinylidene chloride, ethylene, propylene, straight-chain dienes, cyclic dienes etc., may be mentioned. As the cyclic diene; cyclopentadiene, 1,3-cyclohexadiene etc., for example, may be mentioned.

For including the binder in the electrode, the organic compound is dissolved in the solvent, the active material and the ion-conductive high-molecular weight compound etc. are dispersed in it, and the prepared solution is used as a coating liquid. Alternatively the active material and the ion-conductive high-molecular weight compound etc. are dispersed in a dispersant comprising the foregoing organic compound and a dispersant for dispersing the compound, and the prepared solution is used as a coating liquid, etc.

It is desirable to form the ion-conductive high-molecular compound by polymerization initiated by ionizing radiation or ultraviolet rays. Workability is improved by this method as compared with heating and other types of polymerization.

As the ionizing radiation; γ-ray, X-ray, electron beam and neutron beam etc. may be mentioned. The method using these ionizing radiations works very efficiently when the above-mentioned ion-conductive high-molecular weight compound is cross-linked. Namely, the degree of cross-linking of the ion-conductive high-molecular weight compound can be controlled easily by controlling the amount of irradiation and various electrodes and electrolytes, which are optimum from an electrochemical standpoint, can be made up. In addition, the ionizing radiation is excellent in energy efficiency, too.

As the foregoing ion-conductive high-molecular weight compound; a compound may be mentioned which is prepared by polymerizing a high-molecular weight compound having a reactive double bond and a polyether bond so as to have a crosslink network structure. For example, a compound prepared by polymerizing monoacrylate or monomethacrylate of polyethylene glycol with diacrylate or dimethacrylate of polyethylene glycol may be mentioned. Since such an ion-conductive high-molecular compound is a crosslinked polymer formed by the ether bond, it does not include intermolecular hydrogen bonds so that its structure has a low glass transition temperature. For this reason, migration of dissolved ionic compound becomes extremely easy in such an ion-conductive high-molecular weight compound.

As the ionic compound; inorganic ionic salts including one kind of Li, Na or K such as $LiCl_4$, $LiBF_4$, $LiAsF_6$, $LiPF_6$, LiI, LiBr, $Li_2B_{10}Cl_{10}$, $LiCF_3SO_3$, $LiCF_3CO_2$, LiSCN, NaI, NaSCN, NaBr, $NaClO_4$, $KClO_4$ and KSCN etc.; quaternary ammonium salts such as $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4$ N-maleate, $(C_2H_5)_4$N-benzoate and $(C_2H_5)_4$N-phthalate etc.; and organic ionic salts such as lithium stearylsulfonate, sodium octylsulfonate, and lithium dodecylbenzenesulfonate etc.; for example, may be mentioned. These ionic compounds may be used by being combined two or more kinds.

Concerning the compounding ratio of these ionic compounds, a ratio of the ionic compound to ether bond oxygen of the foregoing high-molecular compound is 0.0001 to 5.0 moles, especially a ratio of 0.005 to 2.0 moles is desirable. When the quantity of ionic compound is excessively large, the excessive ionic compound i.e. inorganic ionic salt for example, does not dissociate but is only present as a mixture, so that ion conductivity is decreased conversely as a result. Further, the proper compounding ratio of the ionic compound differs depending on the kind of the electrode active material. For example, a ratio around a value offering the maximum ion conductivity of electrolyte is desirable for a battery utilizing the intercalation of layer compound, and a ratio must be set so as to cope with a change of ion concentration in the electrolyte caused by charging and discharging for a battery using electro-conductive polymer utilizing the doping phenomenon as the electrode active material.

There is no special limitation in how the ionic compound is included. A method may be mentioned, for example, in which the ionic compound is dissolved in an organic solvent such as methyl ethyl ketone or tetrahydrofran etc. and mixed uniformly with the foregoing high-molecular weight compound, and the organic solvent is then removed under vacuum reduced pressure.

An organic compound which can dissolve the ionic compound may be included in the ion-conductive high-molecular weight compound. By doing so, the ion-conductive high-molecular weight compound can be improved markedly in its ionic conductivity without changing its basic skeleton.

As the organic compound which can dissolve the ionic compound; cyclic carbonic esters such as propylene carbonate and ethylene carbonate etc.; cyclic esters such as γ-butyrolactone; ethers such as tetrahydrofuran or its derivative, 1,3-dioxane, 1,2-dimethoxyethane and methyldigraim etc.; nitriles such as acetonitrile and benzonitrile etc.; dioxorane or its derivative; and sulfolane or its derivative etc.; for example, may be mentioned. These compounds may be used independently or by combining two or more kinds. The kind of compound is not limited to those. Any desired compounding ratio and compounding method may be used.

Carbon material may be used as the negative active material. The carbon material has a high doping capacity, a low self-discharge rate, an excellent cycle characteristic, and a base-potential extremely near to that of metallic lithium. A theoretically complicated chemical reaction does not take place at the time of an electrochemical reaction during charging and discharging. Consequently, an extremely excellent charge/discharge cycle characteristic can be obtained when the carbon material is used as the negative active material. In addition, the anode becomes extremely stable from physical and electrochemical standpoints.

As the negative active material; alloys including lithium metal such as lithium-aluminum, lithium-lead, lithium-tin, lithium-aluminum-tin, lithium-gallium and Wood's alloys etc., lithium metals and carbon materials etc., may be mentioned. Two or more of these materials may be combined.

As the carbon material; it is desirable to use materials having analysis results by X-ray diffraction as listed in Table 1, carbon powder prepared by burning anisotropic pitch at a temperature of higher than 2,000° C. (average grain size: under 15 μm inclusive), and carbon fiber etc., for example.

TABLE 1

| Lattice spacing (d002) | 3.35–3.40Å |
| --- | --- |
| Size of crystalline in a-axis direction | La: 200Å or more |
| Size of crystalline in c-axis direction | Lc: 200Å or more |
| True density | 2.00–2.25 g/cm$^3$ |

As the positive active material, the following materials may be mentioned. There are group I metallic compounds such as CuO, $Cu_2O$, $Ag_2O$, CuS and $CuSO_4$ etc.; group IV metallic compounds such as $TiS_2$, $SiO_2$ and SnO etc., group V metallic compounds such as $V_2O_5$, $V_6O_{12}$, $VO_x$, $Nb_2O_5$, $Bi_2O_3$ and $Sb_2O_3$ etc.; group VI metallic compounds such as $CrO_3$, $Cr_2O_3$, $MoS_2$, $WO_3$ and $SeO_2$ etc.; group VII metallic compounds such as $MnO_2$ and $Mn_2O_3$ etc.; group VIII metallic compounds such as $Fe_2O_3$, FeO, $Fe_3O_4$, $Ni_2O_3$, NiO, $CoS_2$ and CoO etc.; metallic compounds such as lithium-cobalt composite oxide and lithium-manganese composite oxide etc., for example, expressed by general formulas of $Li_xMX_2$ and $Li_xMN_yX_2$ (M and N are I- through group VIII metals and X is chalcogens compound such as oxygen and sulfur etc.); electro-conductive high-molecular compounds such as polypyrrole, polyaniline, polyparaphenylene, polyacetylene and polyacene group materials; and pseudo-graphite structural carbon material etc. However, the kind of positive active material is not limited to them.

Concerning the installation of the ion-conductive high-molecular weight compound on a surface of the electrode; it is desirable to coat the compound into a uniform thickness by means of, for example, a roller coating using an applicator roll, a doctor blade method, a spin coating and bar coater etc. However, the kind of coating method is not limited to those. By using these means, it become possible to coat the ion-conductive high-molecular weight compound on the surface of the electrode in any desired thickness and shape.

Concerning the installation of the electrode on the current collector; it is preferable to coat the compound into a uniform thickness by means of, for example, a roller coating using an applicator roll, a doctor blade method, a spin coating and bar coater etc. However, the kind of installation method is not limited to those. By using these means, it becomes possible to increase practical surface areas of the active material in contact with the electrolytes and current collector in the electrode, and it become possible to install the electrode on the current collectors in any desired thickness and shape. In these cases, carbon such as graphite, carbon black and acetylene black etc. (this carbon has properties quite different from those of the carbon used for the negative active material) and electro-conductive material such as metallic powder and electro-conductive metal oxide etc. are mixed in the electrode as occasion demands, so that an electron conductivity may be improved. Further, in order to obtain a uniformly mixed and dispersed system when manufacturing the electrodes, several kinds of dispersants and dispersion media may be added. In addition, a thickener, an extender and a tackifier may be added.

It is preferable to use aluminum, stainless steel, titanium and copper etc. for the positive current collector plate and to use stainless steel, iron, nickel and copper etc. for the negative current collector plate. However, the kind of material is not limited to those.

BEST MODE FOR CARRYING OUT THE INVENTION

Embodiment 1

Figure 1:
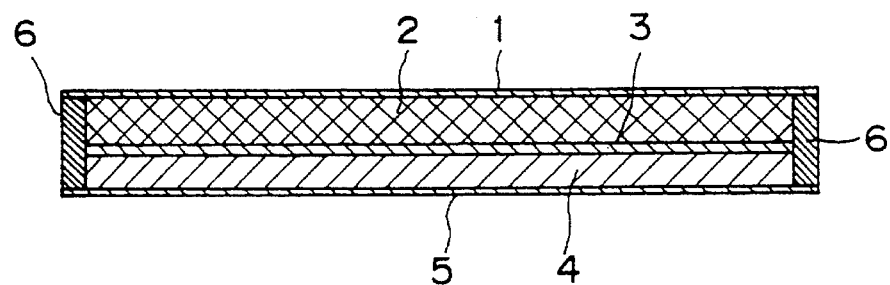
FIG. 1 is a vertical sectional view showing a fundamental structure of battery of this invention.

FIG. 1 is a vertical sectional view showing a film type primary battery which is an example of the battery of this invention. In this figure, 1 is a positive current collector plate comprising stainless steel, 2 is a cathode composite, 3 is an electrolyte layer, 4 is an anode, 5 is a negative current collector plate comprising stainless steel and 6 is a sealing material comprising denatured polypropylene. Both current collector plates 1 and 5 also serve as the outer casings.

In the battery of this invention, palladium forming an element belonging to group VIII of the periodic table is in the cathode composite 2.

The battery of this embodiment was made up through the following processes (a) to (d).

(a); The cathode composite 2 was formed in the following manner. $MnO_2$ forming the positive active material was mixed with acetylene black forming the conductive material in a weight ratio of 85 to 15 (mixture $A_1$). Polyethylene glycol diacrylate (molecular weight: 5000) was mixed with polyethylene glycol monoacrylate (molecular weight: 400) in a weight ratio of 6 to 4 to form a high-molecular weight mixture (mixture $B_1$). 10 weight parts of mixture $B_1$ were mixed with 1 weight part of $LiClO_4$, 20 weight parts of propylene carbonate and 0.2 weight part of palladium treated carbon (palladium content of 1.0%) (mixture $C_1$). Carbon having a brand name of "Palladium on 4- to 8-mesh carbon" made by Aldrich Corp. was used for the foregoing palladium treated carbon, which meant carbon of 4 to 8 meshes coated with palladium. The mixture $A_1$ was mixed with mixture $C_1$ at a weight ratio of 10 to 3 under an atmosphere of dried inert gas (mixture $D_1$). The mixture $D_1$ was cast by means of screen coating on the positive current collector plate 1, on a surface of which a conductive carbon film is formed, and irradiated with electron beam having an electron beam intensity of 10 Mrad under an atmosphere of dried inert gas so as to be cured. A film thickness of the cathode composite 2 formed on the positive current collector plate 1 was 60 μm.

(b); The anode 4 was composed of lithium metal forming the negative active material, and formed by being press bonded to the negative current collector plate 5.

(c); The electrolyte layer 3 was formed on the anode 4 in the following manner. A mixture $B_1$ the same as that of the process (a) was prepared. 30 weight parts of the mixture $B_1$ were mixed with 6 weight parts of $LiClO_4$ and 64 weight parts of propylene carbonate (mixture $E_1$). This mixture $E_1$ was cast by means of screen coating on the anode 4 and irradiated with an electron beam having an electron beam intensity of 8 Mrad under an atmosphere of dried inert gas so as to be cured. The thickness of the electrolyte layer 3 formed on the anode 4 was 20 μm.

(d); A laminate of the cathode composite 2 and the positive current collector plate 1 prepared by process (a) and a laminate of the electrolyte layer 3, the anode 4 and the negative current collector plate 5 prepared by the process (c) were brought together with the cathode composite 2 and the electrolyte layer 3 touching.

In the processes (a) and (c), the mixture $B_1$ is polymerized by means of irradiation by an electron beam to form the ion-conductive high-molecular weight compound having a crosslinked network structure. $LiClO_4$ forming the ionic compound is included in the prepared ion-conductive high-molecular weight compound, preferably dissolved in propylene carbonate.

COMPARISON EXAMPLE 1

A battery of this comparison example is different from that of the embodiment 1 only in that the cathode composite 2 does not include the palladium treated carbon.

Test 1

Discharge tests were done on the batteries of embodiment 1 and comparison example 1 to examine respective discharge characteristics at the initial stage and after long-term preservation. An electrode surface area could be changed variously depending on manufacturing process, however, it was set to 100 $cm^2$ in these tests.

Conditions of discharge tests were a temperature of 25° C., and a current per unit area of 0.1 $mA/cm^2$.

A period of long-term preservation was 100 days at 60° C.

Figure 2:
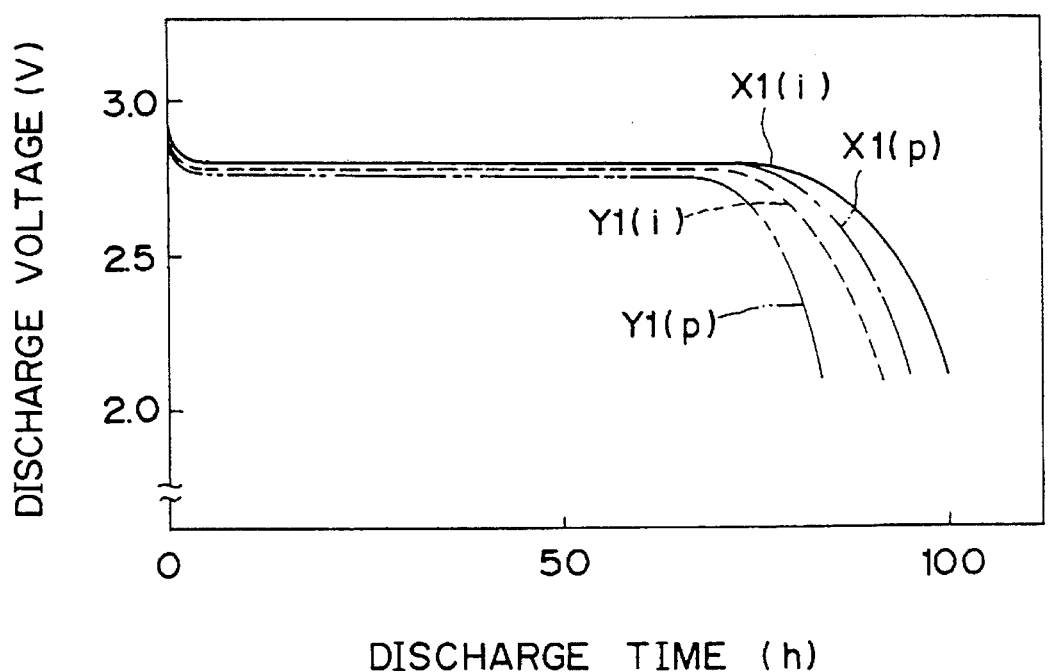
FIG. 2 is a diagram showing the discharge characteristics at the initial stage and after long-term preservation for respective batteries of embodiment 1 and comparison example 1.

FIG. 2 shows discharge characteristics at the initial stage and after long-term preservation. In the figure, X1(i) denotes the discharge characteristic at the initial stage of the battery of embodiment 1, X1(p) denotes the discharge characteristic after long-term preservation of the battery of embodiment 1, Y1(i) denotes the discharge characteristic at the initial stage of the battery of comparison example 1, and Y1(p) denotes the discharge characteristic after long-term preservation of the battery of comparison example 1. Further, the abscissa represents the discharge time (hours) and the ordinate represents the discharge voltage (V).

As is obvious from FIG. 2, the battery of embodiment 1 is excellent in the discharge characteristics both at the initial stage and after long-term preservation as compared with the battery of comparison example 1. This may be attributable to the fact that, since hydrogen gas produced in the battery is absorbed by the palladium included in the cathode composite 2 or added to the residual reactive double bond in the ion-conductive high-molecular compound included in the cathode composite 2 and the electrolyte layer 3, the rise of pressure inside the battery is restrained and expansion of the battery is controlled so that contact of the electrolyte layer 3 with the cathode composite 2 and the anode 4 can be maintained in a desirable state.

Further, respective 25 cells of the batteries of embodiment 1 and comparison example 1 were examined to check the numbers of expanded cells after long-term preservation. The number was zero for the battery of embodiment 1, but it was seven for the battery of comparison example 1. In other words, no expansion was seen in the case of the battery of embodiment 1.

Embodiment 2

This embodiment relates to a film type secondary battery. In the battery of this embodiment, $V_2O_5$ is used for the active material of cathode composite 2, and palladium is included in cathode composite 2. The battery structure is the same as that of the battery shown in FIG. 1.

The battery of this embodiment was made up through the following processes (a) to (d).

(a); The cathode composite 2 was formed in the following manner. $V_2O_5$ forming the positive active material was mixed with acetylene black forming the conductive material at a weight ratio of 85 to 15 (mixture $A_2$). The mixture $B_1$, the same as that of embodiment 1 was prepared. 10 weight parts of mixture $B_1$ were mixed with 1 weight part of $LiAsF_6$, 10 weight parts of ethylene carbonate, 10 weight parts of 2-methyltetrahydrofuran and 0.2 weight part of palladium treated carbon the same as that of embodiment 1 (mixture $C_2$). The mixture $A_2$ was mixed with the mixture $C_2$ at a weight ratio of 10 to 3 under an atmosphere of dried inert gas (mixture $D_2$). The mixture $D_2$ was cast by means of screen coating on the positive current collector plate 1, on a surface of which a conductive carbon film is formed, and irradiated with an electron beam having an electron beam intensity of 10 Mrad under an atmosphere of dried inert gas so as to be cured. A film thickness of the cathode composite 2 formed on the positive current collector plate 1 was 60 μm.

(b); The anode 4 was composed of lithium metal forming the negative active material, and formed by being press bonded to the negative current collector plate 5.

(c); The electrolyte layer 3 was formed on the anode 4 in the following manner. The mixture $B_1$, the same as that of embodiment 1 was prepared. 30 weight parts of the mixture $B_1$ were mixed with 6 weight parts of $LiAsF_6$, 32 weight parts of ethylene carbonate and 32 weight parts of 2-methyltetrahydrofuran (mixture $E_2$). This mixture $E_2$ was cast by means of screen coating on the anode 4, and irradiated with an electron beam having an electron beam intensity of 8 Mrad under an atmosphere of dried inert gas so as to be cured. The thickness of the electrolyte layer 3 formed on the anode 4 was 20 μm.

(d); A laminate of the cathode composite 2 and the positive current collector plate 1 prepared by the process (a) and a laminate of the electrolyte layer 3, the anode 4 and the negative current collector plate 5 prepared by the process (c) were brought together with the cathode composite 2 contacting the electrolyte layer 3.

COMPARISON EXAMPLE 2

The battery of this comparison example is different from that of the embodiment 2 only in that the cathode composite 2 does not include the palladium treated carbon.

Test 2

Charge/discharge cycle tests were done on the batteries of embodiment 2 and comparison example 2 to examine respective charge/discharge cycle characteristics at the initial stage and after long-term preservation. The electrode surface area could be changed variously depending on the manufacturing process, however, it was set to 100 $cm^2$ in these tests.

The conditions of the charge/discharge cycle tests were a temperature of 25° C., a constant current per unit area of 50 μA/$cm^2$, a charge end voltage of 3.2 V and a discharge end voltage of 2.0 V.

The period of long-term preservation was 100 days at 60° C.

Figure 3:
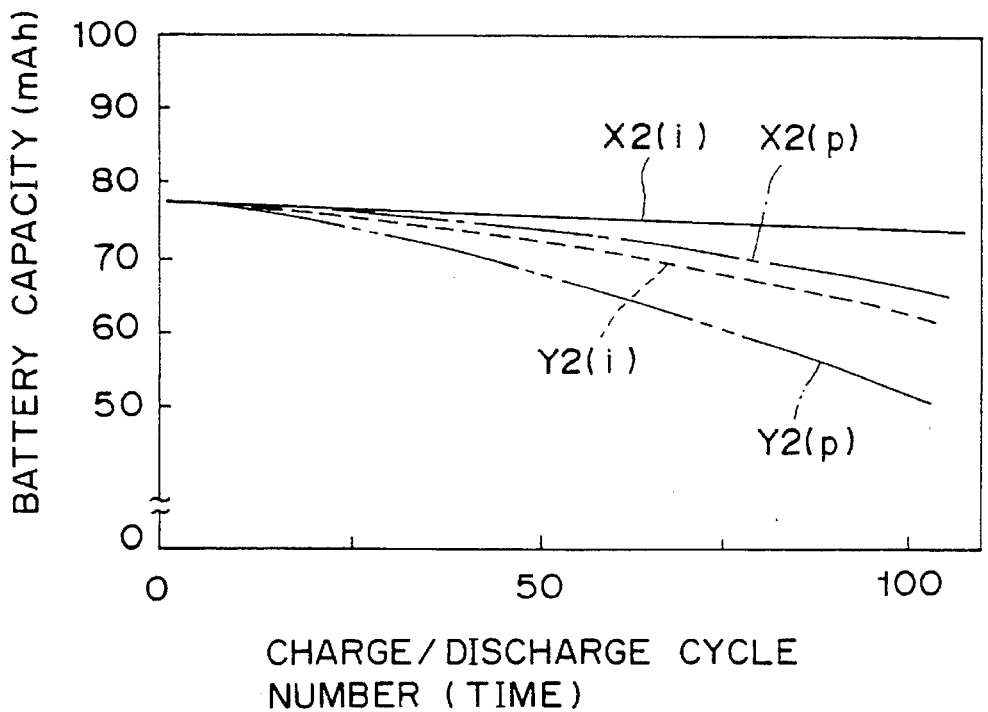
FIG. 3 is a diagram showing the charge/discharge cycle characteristics at the initial stage and after long-term preservation for the respective batteries of embodiment 2 and comparison example 2.

FIG. 3 shows the charge/discharge cycle characteristics at the initial stage and after long-term preservation. In the figure, X2(i) denotes a charge/discharge cycle characteristic at the initial stage of the battery of embodiment 2, X2(p) denotes the charge/discharge cycle characteristic after long-term preservation of the battery of embodiment 2, Y2(i) denotes the charge/discharge cycle characteristic at the initial stage of the battery of comparison example 2 and Y2(p) denotes the charge/discharge cycle characteristic after long-term preservation of the battery of comparison example 2. Further, the abscissa represents a charge/discharge cycle number (time) and the ordinate represents a battery capacity (mAh).

As obvious from FIG. 3, the battery of embodiment 2 is excellent in the charge/discharge cycle characteristics both at the initial stage and after long-term preservation as compared with the battery of comparison example 2. The reason is the same as that of the embodiment 1.

Further, respective 25 cells of the batteries of embodiment 2 and comparison example 2 were examined to check the numbers of expanded cells after long-term preservation. The number was zero for the battery of embodiment 2, but it was five for the battery of comparison example 2. In other words, no expansion was seen in case of the battery of embodiment 2.

Embodiment 3

This embodiment relates to a film type secondary battery. In the battery of this embodiment, $LiCoO_2$ is used for the active material of the cathode composite 2. An anode composite is used in place of the anode of the battery shown in FIG. 1, but other structure is the same as that of the battery shown in FIG. 1. Palladium is present in the cathode composite 2 and the anode composite 4. An aluminum plate is used for the positive current collector plate 1.

The battery of this embodiment was made up through the following processes (a) to (e).

(a); The cathode composite 2 was formed in the following manner. $LiCoO_2$ forming the positive active material was mixed with acetylene black forming the conductive material at a weight ratio of 85 to 15 (mixture $A_3$). A mixture $B_1$, the same with that of the embodiment 1 was prepared. 10 weight parts of the mixture $B_1$ were mixed with 1 weight part of $LiBF_4$, 10 weight parts of 1,2-dimethoxyethane, 10 weight parts of γ-butyrolactone and 0.2 weight part of palladium treated carbon the same as that of the embodiment 1 (mixture $C_3$). Mixture $A_3$ was mixed with mixture $C_3$ at a weight ratio of 10 to 3 under an atmosphere of dried inert gas (mixture $D_3$). The mixture $D_3$ was cast by means of screen coating on the positive current collector plate 1, on a surface of which a conductive carbon film is formed, and irradiated with an electron beam having an electron beam intensity of 12 Mrad under an atmosphere of dried inert gas so as to be cured. The film thickness of the cathode composite 2 formed on the positive current collector plate 1 was 60 μm.

(b); The electrolyte layer 3 was formed on the cathode composite 2 in the following manner. Mixture $B_1$, the same as that of the embodiment 1 was prepared. 30 weight parts of the mixture $B_1$ were mixed with 6 weight parts of $LiBF_4$, 32 weight parts of 1,2-dimethoxyethane and 32 weight parts of γ-butyrolactone (mixture $F_3$). The mixture $F_3$ was cast by means of screen coating on the cathode composite 2 and irradiated with an electron beam having an electron beam intensity of 8 Mrad under an atmosphere of dried inert gas so as to be cured. The film thickness of the electrolyte layer 3 formed on the cathode composite 2 was 25 μm.

(c); The anode composite 4 was formed in the following manner. A mixture $C_3$, the same as that of the process (a) was prepared. Carbon powder forming the negative active material was mixed with the mixture $C_3$ at a weight ratio of 8 to 2 under an atmosphere of dried inert gas (mixture $G_3$). The mixture $G_3$ was cast by means of screen coating on the negative current collector plate 5 and irradiated with an electron beam having an electron beam intensity of 15 Mrad under an atmosphere of dried inert gas so as to be cured. The film thickness of the anode composite 4 formed on the negative current collector plate 5 was 30 μm.

(d); The electrolyte layer 3 was formed on the anode composite 4 in the following manner. The mixture $F_3$, the same as that of the process (b) was prepared. The mixture $F_3$ was cast by means of screen coating on the anode composite 4 and irradiated with an electron beam having an electron beam intensity of 8 Mrad under an atmosphere of dried inert gas so as to be cured. The thickness of the electrolyte layer 3 formed on the anode composite 4 was 25 μm.

(e); A laminate of electrolyte layer 3, cathode composite 2 and positive current collector plate 1 prepared by the process (b) and a laminate of electrolyte layer 3, anode composite 4 and negative current collector plate 5 prepared by the process (d) were brought together at the respective electrolyte layers 3.

COMPARISON EXAMPLE 3

The battery of this comparison example is different from that of the embodiment 3 only in that the cathode composite 2 and the anode composite 4 do not include the palladium treated carbon.

Test 3

Charge/discharge cycle tests were done on the batteries of embodiment 3 and comparison example 3 to examine respective charge/discharge cycle characteristics at the initial stage and after long-term preservation. The electrode surface area could be changed variously depending on manufacturing process, however, it was set to 100 cm² in these tests.

The conditions of the charge/discharge cycle tests were a temperature of 25° C., a constant current per unit area of 50 μA/cm², a charge end voltage of 4.1 V and a discharge end voltage of 2.7 V.

The period of long-term preservation was 100 days at 60° C.

Figure 4:
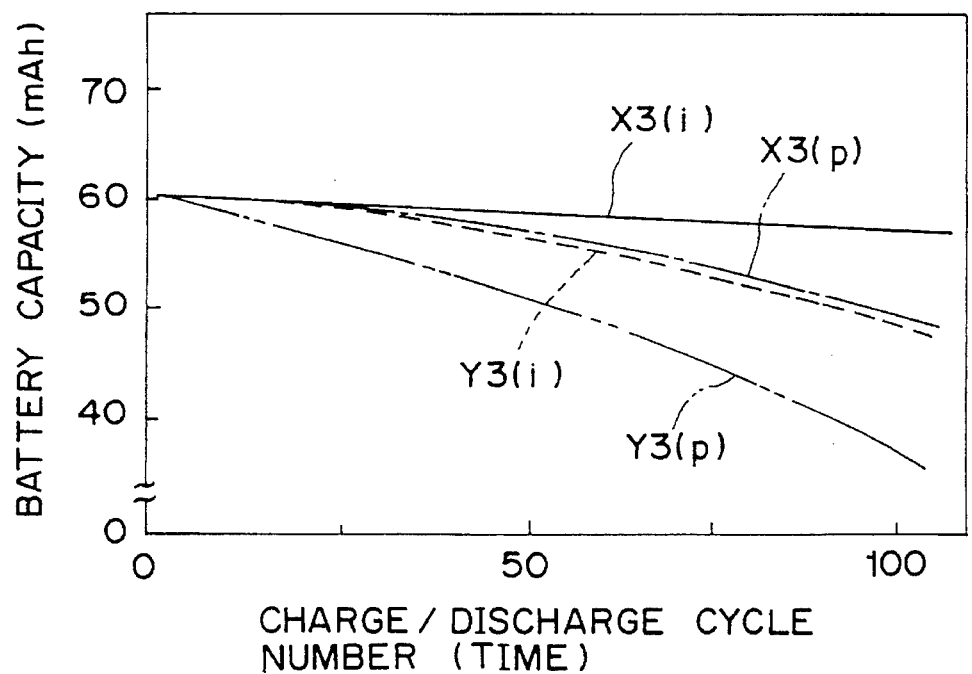
FIG. 4 is a diagram showing the charge/discharge cycle characteristics at the initial stage and after long-term preservation for the respective batteries of embodiment 3 and comparison example 3.

FIG. 4 shows charge/discharge cycle characteristics at the initial stage and after long-term preservation. In the figure, X3(i) denotes a charge/discharge cycle characteristic at the initial stage of the battery of embodiment 3, X3(p) denotes a charge/discharge cycle characteristic after long-term preservation of the battery of embodiment 3, Y3(i) denotes a charge/discharge cycle characteristic at the initial stage of the battery of comparison example 3 and Y3(p) denotes a charge/discharge cycle characteristic after long-term preservation of the battery of comparison example 3. Further, the abscissa represents the charge/discharge cycle number (time) and the ordinate represents a battery capacity (mAh).

As is obvious from FIG. 4, the battery of embodiment 3 is excellent in the charge/discharge cycle characteristics both at the initial stage and after long-term preservation as compared with the battery of comparison example 3. The reason is the same as that of the embodiment 1.

Further, respective 40 cells of the batteries of embodiment 3 and comparison example 3 were examined to check the numbers of expanded cells after long-term preservation. The number was zero for the battery of embodiment 3, but it was 17 for the battery of comparison example 3. In other words, no expansion was seen in the case of the battery of embodiment 3.

Embodiment 4

This embodiment relates to a film type primary battery and the battery structure is the same as the battery shown in FIG. 1. Palladium and a binder are in the cathode composite 2.

The battery of this embodiment was made up through the following processes (a) to (e).

(a); The cathode composite 2 was formed in the following manner. The mixture $A_1$ the same as that of the embodiment 1 was prepared. The mixture $A_1$ was mixed with a xylene solution (2 weight parts solution) of nitrile-butadiene rubber forming the binder and a palladium treated carbon the same as that of the embodiment 1 at a weight ratio of 2.2 to 2.0 to 0.04 under an atmosphere of dried inert gas. This mixture was cast on the positive current collector plate 1, on a surface of which a conductive carbon film was formed by means of screen coating and dried under an atmosphere of dried inert gas so as to be cured. The film thickness of the cathode composite 2 formed on the positive current collector plate 1 was 60 μm.

(b); The electrolyte layer 3 was formed on the cathode composite 2 in the following manner. The mixture $E_1$ the same as that of the embodiment 1 was prepared. This mixture $E_1$ was cast by means of screen coating on the cathode composite 2, and irradiated with an electron beam having an electron beam intensity of 8 Mrad under an atmosphere of dried inert gas so as to be cured. The film thickness of the electrolyte layer 3 formed on the cathode composite 2 was 15 μm.

(c); The anode 4 was composed of lithium metal forming the negative active material, and formed by being press bonded to the negative current collector plate 5.

(d); The electrolyte layer 3 was formed on the anode 4 in the following manner. The mixture $E_1$ the same as that of the embodiment 1 was prepared. This mixture $E_1$ was cast by means of screen coating on the anode 4, and irradiated with an electron beam having an electron beam intensity of 8 Mrad under an atmosphere of dried inert gas so as to be cured. The film thickness of the electrolyte layer 3 formed on the anode 4 was 15 μm.

(e); A laminate of the electrolyte layer 3, the cathode composite 2 and the positive current collector plate 1 prepared by the process (b) and a laminate of the electrolyte layer 3, the anode 4 and the negative current collector plate 5 prepared by the process (d) were brought into contact at the respective electrolyte layers 3.

COMPARISON EXAMPLE 4

A battery of this comparison example is different from that of the comparison example 1 only in that the thickness of the electrolyte layer 3 is 30 μm. Namely, the cathode composite 2 does not include the palladium treated carbon and the binder.

COMPARISON EXAMPLE 5

The battery of this comparison example is different from that of the embodiment 4 only in that the cathode composite 2 includes the binder but does not include the palladium treated carbon and that the electrolyte layer 3 is formed by irradiation by ultraviolet rays.

The battery of this comparison example was made up through the following processes (a) to (e).

(a); The cathode composite 2 was formed in the following manner. The same process (a) of the embodiment 4 was applied except that the palladium treated carbon was omitted. The film thickness of the cathode composite 2 formed on the positive current collector plate 1 was 60 μm.

(b); The electrolyte layer 3 was formed on the cathode composite 2 in the following manner. The mixture $B_1$, the same as that of embodiment 1 was prepared. 30 weight parts of mixture $B_1$ were mixed with 6 weight parts of $LiClO_4$, 64 weight parts of propylene carbonate and 0.03 weight part of benzylmethylketal (mixture $I_5$). This mixture $I_5$ was cast by means of screen coating on the cathode composite 2, and irradiated with ultraviolet rays having an intensity of 20 mW/cm$^2$ for 60 seconds under an atmosphere of dried inert gas so as to be cured. The film thickness of the electrolyte layer 3 formed on the cathode composite 2 was 15 μm.

(c); The anode 4 was composed of lithium metal forming the negative active material, and formed by being press bonded to the negative current collector plate 5.

(d); The electrolyte layer 3 was formed on the anode 4 in the following manner. The mixture $I_5$, the same as that of process (b) was prepared. This mixture $I_5$ was cast by means of screen coating on the anode 4, and irradiated with ultraviolet rays having an intensity of 20 mW/cm$^2$ for 60 seconds under an atmosphere of dried inert gas so as to be cured. The film thickness of the electrolyte layer 3 formed on the anode 4 was 15 μm.

(e); A laminate of the electrolyte layer 3, the cathode composite 2 and the positive current collector plate 1 prepared by process (b) and a laminate of the electrolyte layer 3, the anode 4 and the negative current collector plate 5 prepared by process (d) were brought into contact at the respective electrolyte layers 3.

Test 4

Figure 5:
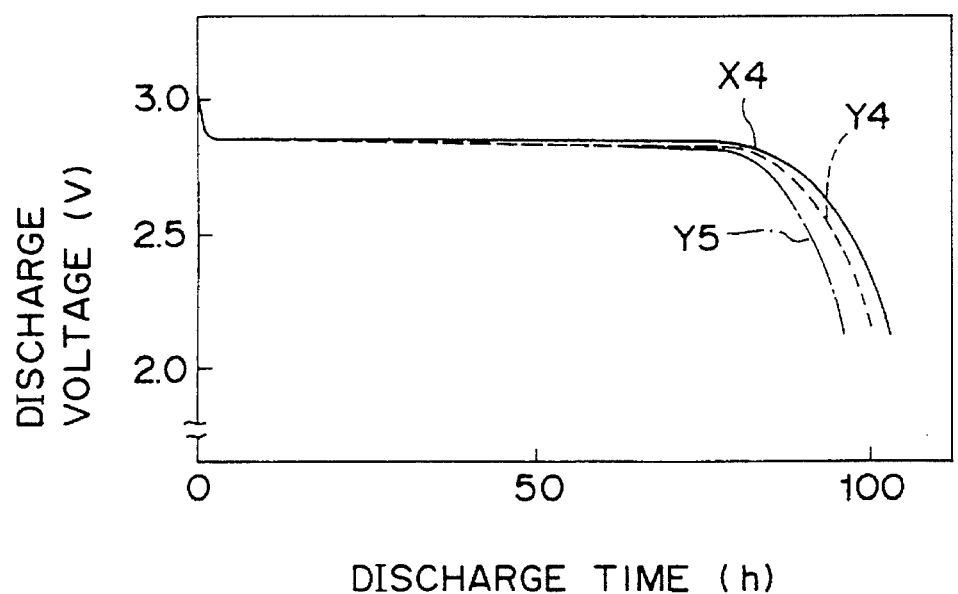
FIG. 5 is a diagram showing the discharge characteristics at the initial stage for the respective batteries of embodiment 4 and comparison examples 4 and 5.
Figure 6:
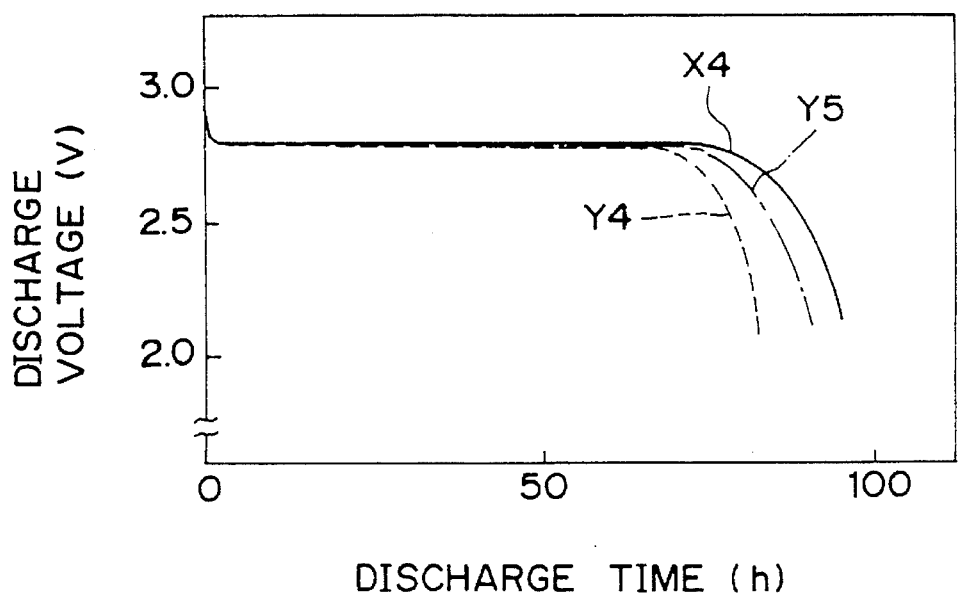
FIG. 6 is a diagram showing the discharge characteristics after long-term preservation for the respective batteries of embodiment 4 and comparison examples 4 and 5.

Discharge tests were done on the batteries of embodiment 4 and comparison examples 4 and 5 using the same test conditions as those of test 1, to examine their respective discharge characteristics at the initial stage and after long-term preservation. FIG. 5 shows the discharge characteristics at the initial stage and FIG. 6 shows the discharge characteristics after long-term preservation. In these figures, X4 denotes the discharge characteristic of the battery of embodiment 4, and Y4 and Y5 denote the discharge characteristics of the batteries of comparison examples 4 and 5 respectively. Further, the abscissa represents the discharge time (hour) and the ordinate represents the discharge voltage (V).

As obvious from FIG. 5 and FIG. 6, the battery of embodiment 4 is excellent in its discharge characteristics both at the initial stage and after long-term preservation as compared with the batteries of comparison examples 4 and 5. The reason can be considered the same as that of embodiment 1.

Further, respective 40 cells of the batteries of embodiment 4 and comparison examples 4 and 5 were examined to check the numbers of expanded cells after long-term preservation. The number was zero for the battery of embodiment 4, but it was nine for the battery of comparison example 4 and 13 for the battery of comparison example 5. In other words, no expansion was seen in the case of the battery of embodiment 4.

Embodiment 5

The battery of this embodiment is different from that of embodiment 4 only in that the cathode composite 2 was formed in the following manner.

The mixture $A_1$, the same as that of embodiment 1 was prepared. The mixture $A_1$ was mixed in a xylene solution (2 weight parts solution) of nitrile-butadiene rubber forming the binder and platinum treated carbon with a weight ratio of 2.2 to 2.0 to 0.06 under the atmosphere of dried inert gas. This mixture was cast on the positive current collector plate 1, on a surface of which a conductive carbon film was formed, by means of screen coating and dried under an atmosphere of dried inert gas so as to be cured. The film thickness of the cathode composite 2 formed on the positive current collector plate 1 was 60 μm. Carbon having a brand name of "Platinum on 4- to 8-mash carbon" made by Aldrich Corp. was used for the platinum treated carbon. This meant carbon of 4 to 8 meshes coated with platinum.

Embodiment 6

The battery of this embodiment is different from that of the embodiment 4 only in that the cathode composite 2 was formed in the following manner.

The mixture $A_1$, the same as that of embodiment 1 was prepared. The mixture $A_1$ was mixed in a xylene solution (2 weight parts solution) of nitrile-butadiene rubber forming the binder and ruthenium treated carbon with a weight ratio of 2.2 to 2.0 to 0.05 under an atmosphere of dried inert gas. This mixture was cured in the same way as that of embodiment 5. The film thickness of the cathode composite 2 formed on the positive current collector plate 1 was 60 μm. Carbon having a brand name of "Ruthenium on 4- to 8-mash carbon" made by Aldrich Corp. was used for the ruthenium treated carbon. This meant carbon of 4 to 8 meshes coated with ruthenium.

Embodiment 7

The battery of this embodiment is different from that of embodiment 4 only in that the cathode composite 2 was formed in the following manner.

The mixture $A_1$, the same as that of embodiment 1 was prepared. The mixture $A_1$ was mixed in a xylene solution (2 weight parts solution) of nitrile-butadiene rubber forming the binder and rhodium treated carbon with a weight ratio of 2.2 to 2.0 to 0.05. This mixture was cured in the same way as that of the embodiment 5. The film thickness of the cathode composite 2 formed on the positive current collector plate 1 was 60 μm. Carbon having a brand name of "Rhodium on 4- to 8-mash carbon" made by Aldrich Corp. was used for the rhodium treated carbon. This meant carbon of 4 to 8 meshes coated with rhodium.

Test 5

Respective 40 cells of the batteries of embodiments 5, 6 and 7 were examined to the check numbers of expanded cells after 100 days preservation at 60° C. i.e. after long-term preservation. The number was zero for the battery of embodiment 5, but it was one for the batteries of embodiments 6 and 7 respectively. In other words, expansion could be restrained even when platinum, ruthenium and rhodium were included in place of palladium.

Embodiment 8

This embodiment relates to a film type secondary battery. In the battery of this embodiment, $LiCoO_2$ is used for the active material of the cathode composite 2. An anode composite is used in place of the anode of the battery shown in FIG. 1, and other components are the same as those of the battery shown in FIG. 1. Palladium and the binder are present in the cathode composite 2 and the anode composite 4. An aluminum plate is used for the positive current collector plate 1.

The battery of this embodiment was made up through the following processes (a) to (e).

(a); The cathode composite 2 was formed in the following manner. Mixture $A_3$, the same as that of the embodiment 3 was prepared. Mixture $A_3$ was mixed in a dimethylformamide solution (2 wt % solution) of polyacrylonitrile forming the binder and the palladium treated carbon the same as that of embodiment 1 with a weight ratio of 2.4 to 2.0 to 0.04 under an atmosphere of dried inert gas. This mixture was cast on the positive current collector plate 1, on a surface of which a conductive carbon film was formed, by means of screen coating and dried under an atmosphere of dried inert gas so as to be cured. The film thickness of the cathode composite 2 formed on the positive current collector plate 1 was 60 μm.

(b); The electrolyte layer 3 was formed on the cathode composite 2 in the following manner. The mixture $F_3$, the same as that of embodiment 3 was prepared. This mixture $F_3$ was cast by means of screen coating on the cathode composite 2 under an atmosphere of dried inert gas, and irradiated with an electron beam having an electron beam intensity of 8 Mrad under an atmosphere of dried inert gas so as to be cured. The film thickness of the electrolyte layer 3 formed on the cathode composite 2 was 25 μm.

(c); The anode composite 4 was formed in the following manner. Carbon powder forming the negative active material, a toluene solution (2 weight parts solution) of a copolymer of ethylene-propylene-cyclopentadiene and the palladium treated carbon the same as that of embodiment 1 were mixed with a weight ratio of 2.0 to 5.0 to 0.025 under an atmosphere of dried inert gas. This mixture was cast on the negative current collector plate 5 by means of screen coating, and dried under an atmosphere of dried inert gas so as to be cured. The film thickness of the anode composite 4 formed on the negative current collector plate 5 was 30 μm.

(d); The electrolyte layer 3 was formed on the anode composite 4 in the following manner. The mixture $F_3$, the same as that of embodiment 3 was prepared. This mixture $F_3$ was cast by means of screen coating on the anode composite 4 under the atmosphere of dried inert gas, and irradiated with an electron beam having an electron beam intensity of 8 Mrad under an atmosphere of dried inert gas so as to be cured. The film thickness of the electrolyte layer 3 formed on the anode composite 4 was 25 μm.

(e); A laminate of the electrolyte layer 3, the cathode composite 2 and the positive current collector plate 1 prepared by the process (b) and a laminate of the electrolyte layer 3, the anode composite 4 and the negative current collector plate 5 prepared by the process (d) were brought into contact with each other at the respective electrolyte layers 3.

COMPARISON EXAMPLE 6

The battery of this comparison example is different from that of embodiment 8 only in that the cathode composite 2 and the anode composite 4 include the binder but they do not include the palladium treated carbon, and that the electrolyte layer 3 is formed by ultraviolet irradiation.

The battery of this comparison example was made up through the following processes (a) to (e).

(a); The cathode composite 2 was formed in the following manner. The same process (a) as embodiment 8 was applied except that the palladium treated carbon was omitted. The film thickness of the cathode composite 2 formed on the positive current collector plate 1 was 60 μm.

(b); The electrolyte layer 3 was formed on the cathode composite 2 in the following manner. The mixture $B_1$, the same as that of embodiment 1 was prepared. 30 weight parts of mixture $B_1$ was mixed with 6 weight parts of $LiBF_4$, 32 weight parts of 1,2-dimethoxyethane, 32 weight parts of γ-butyrolactone and 0.03 weight part of benzylmethylketal (mixture $I_6$). This mixture $I_6$ was cast by means of screen coating on the cathode composite 2 under an atmosphere of dried inert gas, and irradiated with ultraviolet rays having an intensity of 20 $mW/cm^2$ for 60 seconds under the atmosphere of dried inert gas so as to be cured. The film thickness of the electrolyte layer 3 formed on the cathode composite 2 was 25 μm.

(c); The anode composite 4 was formed in the following manner. The same process (c) as embodiment 8 was applied except that the palladium treated carbon was omitted. The film thickness of the anode composite 4 formed on the negative current collector plate 5 was 30 μm.

(d); The electrolyte layer 3 was formed on the anode composite 4 in the following manner. The mixture $I_6$, the same as that of process (b) was prepared. This mixture $I_6$ was cast by means of screen coating on the anode composite 4 under an atmosphere of dried inert gas, and irradiated with ultraviolet rays having an intensity of 20 $mW/cm^2$ for 60 seconds under an atmosphere of dried inert gas so as to be cured. The film thickness of the electrolyte layer 3 formed on the anode composite 4 was 25 μm.

(e); A laminate of the electrolyte layer 3, the cathode composite 2 and the positive current collector plate 1 prepared by the process (b) and a laminate of the electrolyte layer 3, the anode 4 and the negative current collector plate 5 prepared by the process (d) were brought into contact with each other at the respective electrolyte layers 3.

Test 6

Charge/discharge cycle tests were done on the batteries of embodiment 8 and comparison examples 3 and 6 using the same test conditions as those of test 3, to examine the respective charge/discharge cycle characteristics at the initial stage and after long-term preservation.

Figure 7:
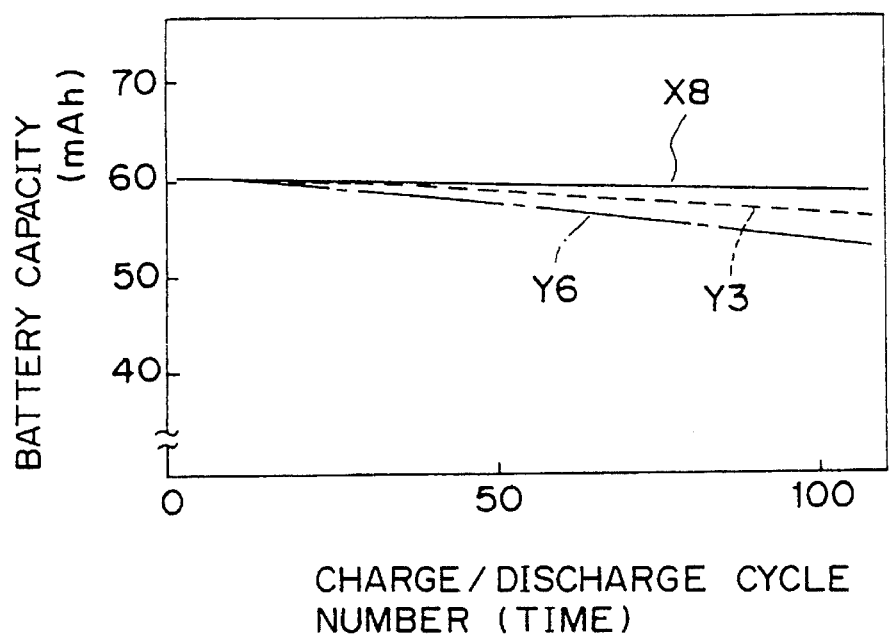
FIG. 7 is a diagram showing the discharge characteristics at the initial stage for the respective batteries of embodiment 8 and comparison examples 3 and 6.
Figure 8:
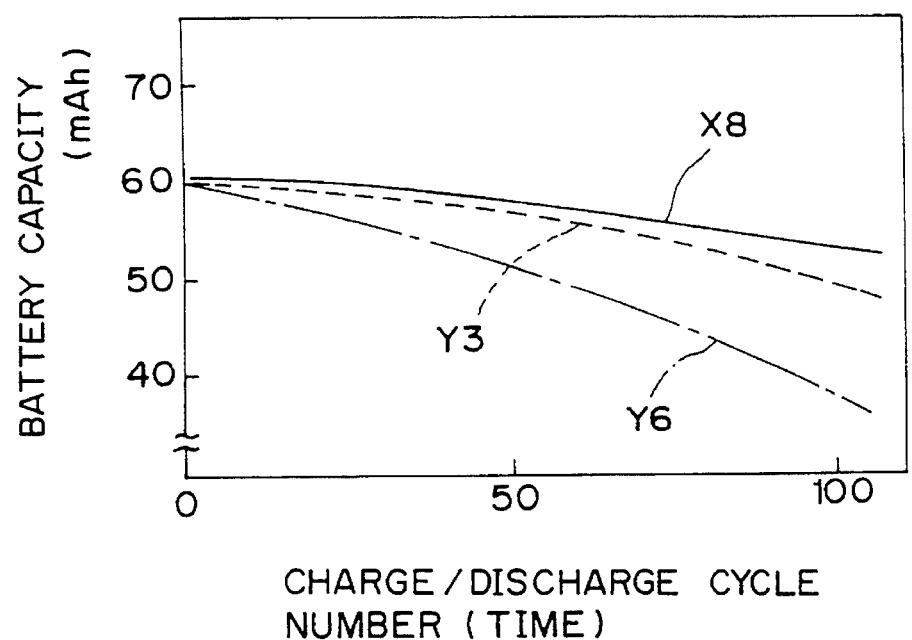
FIG. 8 is a diagram showing the discharge characteristics after long-term preservation for the respective batteries of embodiment 8 and comparison examples 3 and 6.

FIG. 7 shows the charge/discharge cycle characteristics at the initial stage and FIG. 8 shows the charge/discharge cycle characteristics after long-term preservation. In these figures, X8 denotes the charge/discharge cycle characteristic of the battery of embodiment 8, Y3 denotes the charge/discharge cycle characteristic of the battery of comparison example 3 and Y6 denotes the charge/discharge cycle characteristic after long-term preservation of the battery of comparison example 6. Further, the abscissa represents the charge/discharge cycle number (time) and the ordinate represents the battery capacity (mAh).

As is obvious from FIG. 7 and FIG. 8, the battery of embodiment 8 is excellent in the charge/discharge cycle characteristics both at the initial stage and after long-term preservation as compared with the batteries of comparison examples 3 and 6. The reason can be considered the same as that of embodiment 1.

Further, respective 40 cells of the batteries of embodiment 8 and comparison examples 3 and 6 were examined to check the numbers of expanded cells after long-term preservation. The number was zero for the battery of embodiment 8, but it was nine for the battery of comparison example 3 and 13 for the battery of comparison example 6. In other words, no expansion was seen in the case of the battery of embodiment 8.

Embodiment 9

This embodiment relates to a film type primary battery. The battery structure is the same as that of the battery shown in FIG. 1. Palladium is included in the cathode composite 2.

The battery of this embodiment was made up through the following processes (a) to (d).

(a); The cathode composite 2 was formed in the following manner. The mixture $A_2$, the same as that of embodiment 2 was prepared. The mixture $C_1$, the same as that of embodiment 1 was prepared. The mixture $A_2$ was mixed with the mixture $C_1$ with a weight ratio of 10 to 3 under an atmosphere of dried inert gas. This mixture was cast by means of screen coating on the positive current collector plate 1, on a surface of which a conductive carbon film was formed, and irradiated with an electron beam having an electron beam intensity of 10 Mrad under an atmosphere of dried inert gas so as to be cured. A film thickness of the cathode composite 2 formed on the positive current collector plate 1 was 60 μm.

(b); The anode 4 was composed of lithium metal forming the negative active material, and formed by being press bonded to the negative current collector plate 5.

(c); The electrolyte layer 3 was formed on the anode 4 in the following manner. The mixture $E_1$, the same as that of embodiment 1 was prepared. This mixture $E_1$ was cast by means of screen coating on the anode 4, and irradiated with an electron beam having an electron beam intensity of 8 Mrad under an atmosphere of dried inert gas so as to be cured. The thickness of the electrolyte layer 3 formed on the anode 4 was 20 μm.

(d); A laminate of the cathode composite 2 and the positive current collector plate 1 prepared by the process (a) and a laminate of the electrolyte layer 3, the anode 4 and the negative current collector plate 5 prepared by the process (c) were brought into contact with each other at the cathode composite 2 and the electrolyte layer 3.

COMPARISON EXAMPLE 7

The battery of this comparison example is different from that of embodiment 9 only in that the cathode composite 2 does not include the palladium treated carbon.

Embodiment 10

This embodiment relates to a film type primary battery and the battery structure is the same as that of the battery shown in FIG. 1. In the battery of this embodiment, palladium is included in the electrolyte layer 3, and a binder is used in the cathode composite 2.

The battery of this embodiment was made up through the following processes (a) to (e).

(a); The cathode composite 2 was formed in the following manner. The mixture $A_1$, the same as that of embodiment 1 was prepared. The mixture $A_1$ was mixed in a xylene solution (2 weight parts solution) of nitrile-butadiene rubber with a weight ratio of 2.2 to 2.0 under an atmosphere of dried inert gas. This mixture was cast by means of screen coating on the positive current collector plate 1, on a surface of which a conductive carbon film was formed, and dried under the atmosphere of dried inert gas so as to be cured. The film thickness of the cathode composite 2 formed on the positive current collector plate 1 was 60 μm.

(b); The electrolyte layer 3 was formed on the cathode composite 2 in the following manner. The mixture $B_1$, the same as that of embodiment 1 was prepared. 30 weight parts of mixture $B_1$ were mixed to 6 weight parts of $LiClO_4$, 64 weight parts of propylene carbonate and 1.4 weight parts of palladium treated carbon the same as that of embodiment 1. This mixture was cast by means of screen coating on the cathode composite 2, and irradiated with an electron beam having an electron beam intensity of 8 Mrad under an atmosphere of dried inert gas so as to be cured. The thickness of the electrolyte layer 3 formed on the cathode composite 2 was 15 μm.

(c); The anode 4 was composed of lithium metal forming the negative active material, and formed by being press bonded to the negative current collector plate 5.

(d); The electrolyte layer 3 was formed on the anode 4 in the following manner. The mixture $E_1$, the same as that of the embodiment 1 was prepared. This mixture $E_1$ was cast by means of screen coating on the anode 4, and irradiated with an electron beam having an electron beam intensity of 8 Mrad under an atmosphere of dried inert gas so as to be cured. The thickness of the electrolyte layer 3 formed on the anode 4 was 15 μm.

(e); A laminate of the electrolyte layer 3, the cathode composite 2 and the positive current collector plate 1 prepared by process (b) and a laminate of the electrolyte layer 3, the anode 4 and the negative current collector plate 5 prepared by process (d) were brought together at the respective electrolyte layers 3.

Test 7

Figure 9:
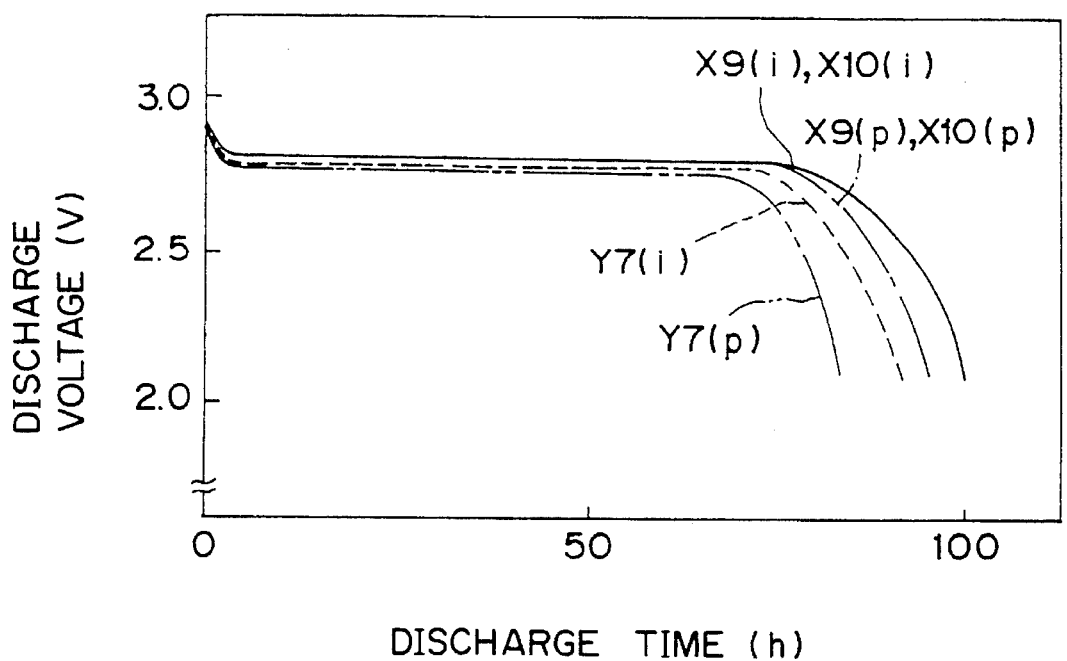
FIG. 9 is a diagram showing the discharge characteristics at the initial stage and after long-term preservation for the respective batteries of embodiments 9 and 10 and comparison example 7.

Discharge tests were done on the batteries of embodiments 9 and 10 and comparison example 7 using the same conditions as those of test 1, to examine the respective discharge characteristics at the initial stage and after long-term preservation. FIG. 9 shows the discharge characteristics at the initial stage and after long-term preservation. In the figure, X9(i) and X10(i) denote the discharge characteristics at the initial stage of the batteries of embodiments 9 and 10, X9(p) and X10(p) denote the discharge characteristics after long-term preservation of the batteries of embodiments 9 and 10, Y7(i) denotes the discharge characteristic at the initial stage of the battery of comparison example 7 and Y7(p) denotes the discharge characteristic after long-term preservation of the battery of comparison example 7. Further, the abscissa represents the discharge time (hour) and the ordinate represents a discharge voltage (V).

As is obvious from FIG. 9, the batteries of embodiments 9 and 10 are excellent in the discharge characteristics both at the initial stage and after long-term preservation as compared with the batteries of comparison example 7. The reason can be considered as the same with that of the embodiment 1.

Further, respective 25 cells of the batteries of embodiments 9 and 10 and comparison example 7 were examined to check the numbers of expanded cells after long-term preservation. The number was zero for the batteries of embodiments 9 and 10, but it was seven for the battery of comparison example 7. In other words, no expansion was seen in case of the batteries of embodiments 9 and 10.

Embodiment 11

This embodiment relates to a film type secondary battery. In the battery of this embodiment, $LiCoO_2$ is used for the active material of the cathode composite 2. An anode composite is used in place of the anode for the battery shown in FIG. 1, and other components are the same as those of the battery shown in FIG. 1. In the battery of this embodiment, palladium is included in the electrolyte layer 3. Further, a binder is used in the cathode composite 2 and the anode composite 4. An aluminum plate is used for the positive current collector plate 1.

The battery of this embodiment was made up through the following processes (a) to (e).

(a); The cathode composite 2 was formed in the following manner. The mixture $A_3$, the same as that of embodiment 3 was prepared. The mixture $A_3$ was mixed in a dimethylformamide solution (2 wt % solution) of polyacrylonitrile forming the binder with a weight ratio of 2.4 to 2.0 under an atmosphere of dried inert gas. This mixture was cast by means of screen coating on the positive current collector plate 1, on a surface of which a conductive carbon film was formed, and dried under an atmosphere of dried inert gas so as to be cured. The film thickness of the cathode composite 2 formed on the positive current collector plate 1 was 60 μm.

(b); The electrolyte layer 3 was formed on the cathode composite 2 in the following manner. The mixture $B_1$, the same as that of embodiment 1 was prepared. 30 weight parts of mixture $B_1$ were mixed with 6 weight parts of $LiBF_4$, 32 weight parts of 1,2-dimethoxyethane, 32 weight parts of γ-butyrolactone and 1.5 weight parts of palladium treated carbon the same as that of embodiment 1. This mixture was cast by means of screen coating on the cathode composite 2, and irradiated with an electron beam having an electron beam intensity of 8 Mrad under the atmosphere of dried inert gas so as to be cured. The thickness of the electrolyte layer 3 formed on the cathode composite 2 was 25 μm.

(c); The anode composite 4 was formed in the following manner. Carbon powder forming the negative active material and a toluene solution (2 weight parts solution) of a copolymer of ethylene-propylene-cyclopentadiene were mixed with a weight ratio of 2.0 to 5.0 under an atmosphere of dried inert gas. This mixture was cast by means of screen coating on the negative current collector plate 5 and dried under an atmosphere of dried inert gas so as to be cured. The film thickness of the anode composite 4 formed on the negative current collector plate 5 was 30 μm.

(d); The electrolyte layer 3 was formed on the anode composite 4 in the following manner. The mixture $F_3$, the same as that of embodiment 3 was prepared. This mixture $F_3$ was cast by means of screen coating on the anode composite 4 under an atmosphere of dried inert gas, and irradiated with an electron beam having an electron beam intensity of 8 Mrad under an atmosphere of dried inert gas so as to be cured. The film thickness of the electrolyte layer 3 formed on the anode composite 4 was 25 μm.

(e); A laminate of the electrolyte layer 3, the cathode composite 2 and the positive current collector plate 1 prepared by the process (b) and a laminate of the electrolyte layer 3, the anode composite 4 and the negative current collector plate 5 prepared by the process (d) were brought together at the respective electrolyte layers 3.

Test 8

Figure 10:
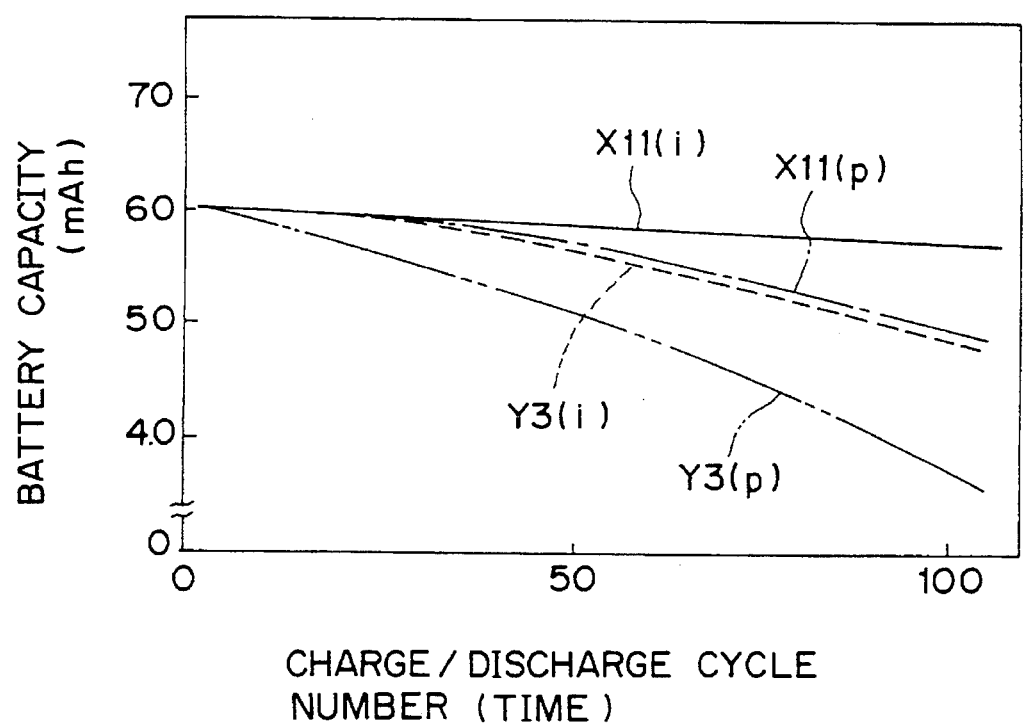
FIG. 10 is a diagram showing the charge/discharge cycle characteristics at the initial stage and after long-term preservation for the respective batteries of embodiment 11 and comparison example 3.

A charge/discharge cycle test was done on the battery of embodiment 11 using the same conditions as those of test 3, to examine the charge/discharge cycle characteristics at the initial stage and after long-term preservation. FIG. 10 shows charge/discharge cycle characteristics at the initial stage and after long-term preservation. Further, the cycle characteristics of the battery of comparison example 3 are also shown in the figure. In these figures, X11(i) denotes the discharge characteristic at the initial stage of the battery of embodiment 11, X11(p) denotes the discharge characteristic after long-term preservation of the battery of embodiment 11, Y3(i) denotes the discharge characteristic at the initial stage of the battery of comparison example 3, and Y3(p) denotes the discharge characteristic after long-term preservation of the battery of comparison example 3. Further, the abscissa represents the discharge time (hour) and the ordinate represents the discharge voltage (V).

As is obvious from FIG. 10, the battery of embodiment 11 is excellent in the discharge characteristics both at initial stage and after long-term preservation as compared with the battery of comparison example 3. The reason is the same as that of the embodiment 1.

Further, 25 cells of the battery of embodiment 11 were examined to check the numbers of expanded cells after long-term preservation. The number was zero for the battery of embodiment 11. In other words, no expansion was observed in the case of the battery of embodiment 11.

Embodiment 12

In the battery of this embodiment; the palladium treated carbon, the same as that of embodiment 1 was installed on a surface of the anode 4 composed of lithium metal, the palladium treated carbon was omitted in the cathode composite 2, and the other components were the same as those of the embodiment 9.

Embodiment 13

In the battery of this embodiment; the palladium treated carbon, the same as that of embodiment 1 was installed between the cathode composite 2 and the electrolyte layer 3, the palladium treated carbon was omitted in the cathode composite 2, and the other components were the same as those of the embodiment 9.

Embodiment 14

Figure 11:
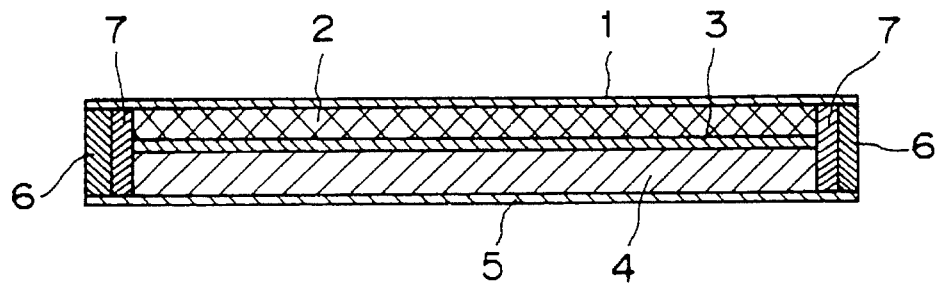
FIG. 11 is a vertical sectional view showing a fundamental structure of the battery of embodiment 14.

In the battery of this embodiment; the palladium treated carbon, the same as that of embodiment 1 was installed on a surface of the sealing material 6 as illustrated in FIG. 11, the palladium treated carbon was omitted in the cathode composite 2, and the other components were the same as those of embodiment 9. In FIG. 11, 7 is the palladium treated carbon and the other components are the same as those of FIG. 1.

Embodiment 15

The battery of this embodiment relates to a film type primary battery and is made up in the following manner.

85 weight parts of $MnO_2$ forming the positive active material, 7 weight parts of acetylene black forming the conductive material, 5 weight parts of polytetrafluoroethylene forming the binder, and 3 weight parts of palladium treated carbon, the same as that of embodiment 1 were mixed, so that a composite sheet having a thickness of 0.2 mm comprising the mixture was formed. A stainless foil on a periphery of which denatured polypropylene forming the sealing material was placed, was prepared. The foregoing composite sheet was press bonded onto the stainless foil to prepare the cathode.

On the other hand, a lithium foil having a thickness of about 0.1 mm was press bonded to the stainless foil to prepare the anode. An electrolyte comprising propylene carbonate solution dissolved with $LiClO_4$ of 1 mol. was impregnated under reduced pressure to a separator comprising polypropylene non-woven fabric and the cathode.

The cathode, the separator and the anode were laminated, and the peripheral sealing material was heat sealed to complete the battery.

COMPARISON EXAMPLE 8

In the battery of this comparison example; the amount of acetylene black in the composite sheet of the cathode was 10 weight parts, the palladium treated carbon was omitted, and the other components were the same as those of embodiment 15.

Test 9

Respective 25 cells of the batteries of embodiments 12 through 15 and comparison example 8 were examined to check the numbers of expanded cells after 100 days preservation at 60° C., i.e., after long-term preservation. The number was zero for the batteries of embodiments 12 through 15, but it was ten for the battery of comparison example 8. In other words, no expansion was observed in the case of the batteries of embodiments 12 through 15.

Embodiment 16

The battery of this embodiment relates to a film type secondary battery and is made up in the following manner.

85 weight parts of $LiCoO_2$ forming the positive active material, 7 weight parts of acetylene black forming the conductive material, 5 weight parts of polytetrafluoroethylene forming the binder, and 3 weight parts of palladium treated carbon, the same as that of embodiment 1 were mixed, so that a composite sheet having a thickness of 0.2 mm comprising the mixture was formed. An aluminum foil on a periphery of which denatured polypropylene forming the sealing material was placed, was prepared. The foregoing composite sheet was press bonded onto the aluminum foil to prepare the cathode.

On the other hand, 95 weight parts carbon powder forming the negative active material and 5 weight parts of polytetrafluoroethylene forming the binder were mixed, so that a composite sheet having a thickness of 0.2 mm comprising the mixture was formed. The composite sheet was press bonded onto a nickel foil to form the anode. An electrolyte comprising ethylene carbonate solution dissolved with $LiPF_6$ of 1 mol. was impregnated under reduced pressure to a separator comprising polypropylene porous film, the cathode and the anode.

The cathode, the separator and the anode were laminated, and the peripheral sealing material was heat sealed to complete the battery.

COMPARISON EXAMPLE 9

In the battery of this comparison example; the amount of acetylene black in the composite sheet of the cathode was 10 weight parts, the palladium treated carbon was omitted, and the other components were the same as those of the embodiment 16.

Embodiment 17

In the battery of this embodiment; the composite sheet of the anode was formed by mixing 92 weight parts of carbon powder, 25 weight parts of polytetrafluoroethylene and 3 weight parts of palladium treated carbon, the same as that of embodiment 1, and the other components were the same as those of the comparison example 9.

Test 10

Charge/discharge cycle tests were done on the batteries of embodiments 16 and 17 and comparison example 9, to examine the respective charge/discharge cycle characteristics at the initial stage and after long-term preservation. The electrode surface area could be changed variously depending on the manufacturing process, however, it was set to 100 $cm^2$ in these tests.

Conditions of charge/discharge cycle tests were a temperature of 25° C., a constant current per unit area of 0.5 $mA/cm^2$, a charge end voltage of 4.1 V, and a discharge end voltage of 2.7 V.

The period of long-term preservation was 100 days at 60° C.

Figure 12:
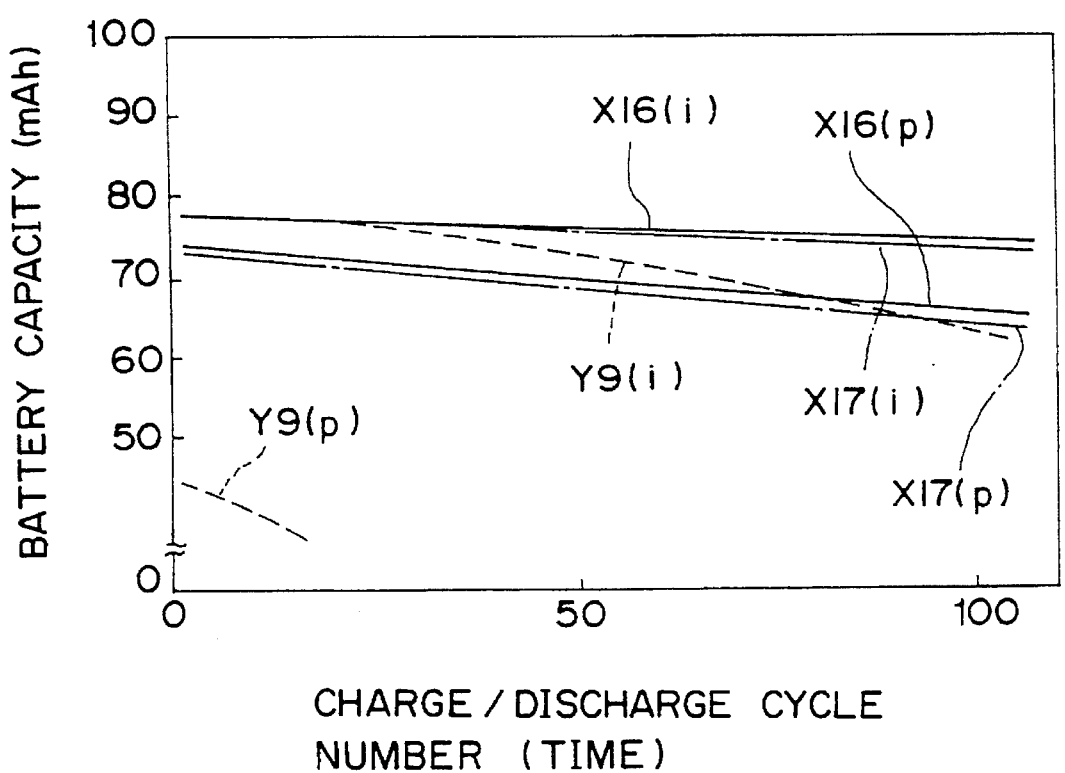
FIG. 12 is a diagram showing the charge/discharge cycle characteristics at the initial stage and after long-term preservation for the respective batteries of embodiments 16 and 17 and comparison example 9.

FIG. 12 shows the charge/discharge cycle characteristics at the initial stage and after long-term preservation. In the figure, X16(i) and X17(i) denote the charge/discharge cycle characteristics at the initial stage of the batteries of embodiments 16 and 17, X16(p) and X17(p) denote the charge/discharge cycle characteristics after long-term preservation of the batteries of embodiments 16 and 17 respectively, Y9(i) denotes the charge/discharge cycle characteristic at the initial stage of the battery of comparison example 9, and Y9(p) denotes the charge/discharge cycle characteristic after long-term preservation of the battery of comparison example 9. Further, the abscissa represents the charge/discharge cycle number (time) and the ordinate represents the battery capacity (mAh).

As is obvious from FIG. 12, capacity decreases at the initial stage were small and capacity decreases after long-term preservation were also small in the batteries of embodiments 16 and 17. However, both capacity decreases were large in the battery of comparison example 9. Further, no expansion was produced in the batteries of embodiments 16 and 17 during the tests. However, expansion was produced in the battery of comparison example 9 as the cycle advanced and the expansion was positively produced after long-term preservation. It can be concluded that, in the battery of comparison example 9, the impedance of the battery was increased by the expansion to cause the decrease in capacity.

In the foregoing embodiments, the palladium treated carbon etc. included in the electrode composites may be used by being previously smeared to the active material.

INDUSTRIAL APPLICABILITY

The battery of this invention, which is provided with a high long-term reliability and controlled its expansion and bursting, has a large industrial value in use.

What is claimed is:

1. A battery which comprises an inside chamber defined by current collector plates and a sealing material, said chamber containing
   (A) a cathode composite comprising an active material and another component,
   (B) an anode comprising one of
      (1) an anode composite comprising an active material and another component, and
      (2) the active material only,
   (C) an electrolyte,
      wherein at least one of the cathode composite, the anode composite and the electrolyte includes an ion-conductive high-molecular weight compound containing at least one ionic compound in solution; and
   (D) at least one material capable of eliminating gas produced inside the battery,
   wherein said gas eliminating material is active carbon zeolite, hollow glass spheres, ethyl ether, acetone, gelatin, starch or dextrin.

2. A battery as set forth in claim 1, in which said gas eliminating material is disposed in or on a surface of the cathode composite.

3. A battery as set forth in claim 1, in which said gas eliminating material is disposed in or on a surface of the anode composite.

4. A battery as set forth in claim 1, in which said gas eliminating material is disposed on a surface of the anode.

5. A battery, which comprises an inside chamber defined by current collector plates and a sealing material, said chamber containing
   (A) a cathode composite comprising an active material and another component,
   (B) an anode comprising one of
      (1) an anode composite comprising an active material and another component, and
      (2) the active material only,
   (C) an electrolyte,
      wherein at least one of the cathode composite, the anode composite and the electrolyte includes an ion-conductive high-molecular weight compound containing at least one ionic compound in solution; and
   (D) at least one material capable of eliminating gas produced inside the battery,
   wherein said gas eliminating material is disposed on a surface of the sealing material.

6. A battery as set forth in claim 1, in which said gas eliminating material is disposed in the electrolyte layer.

7. A battery as set forth in claim 1, in which said gas eliminating material is an element belonging to group VIII of the periodic table.

8. A battery as set forth in claim 7, in which said element is palladium, ruthenium, rhodium or platinum.

9. A battery as set forth in claim 1, in which said gas eliminating material is palladium treated carbon, palladium treated $MnO_2$, platinum black, platinum treated carbon, misch metal alloy or $LaNi_5$.

10. A battery as set forth in claim 9, in which the misch metal is $MmNi_{3.7}Fe_{0.3}Al_{0.3}Co_{0.7}$.

11. A battery as set forth in claim 1, in which at least one of the cathode composite and the anode composite includes a binder.

12. A battery as set forth in claim 1, in which the ion-conductive high-molecular weight compound is formed by radiation polymerization using ionizing radiation or ultraviolet ray.

13. A battery as set forth in claim 1, in which the ion-conductive high-molecular weight compound is formed by polymerizing a high-molecular weight compound, which has a reactive double bond and a polyether bond, so as to include a crosslink network structure.

14. A battery as set forth in claim 1, in which the ion-conductive high-molecular weight compound includes an organic compound which can dissolve an ionic compound.

15. A battery as set forth in claim 1, in which the anode composite includes a carbon material as an active material.

16. A battery as set forth in claim 1, wherein said gas eliminating material absorbs hydrogen produced inside the battery.

17. A battery as set forth in claim 1, wherein said gas eliminating material causes hydrogen produced inside the battery to add to residual reactive double bonds in the ion-conductive high-molecular weight compound.

18. A battery as set forth in claim 1, wherein the battery is a lithium battery.

* * * * *